United States Patent [19]

Schädlich

[11] 4,343,214
[45] Aug. 10, 1982

[54] ARRANGEMENT FOR FASTENING A CIRCULAR SAW BLADE ON A TRUNNION AXIALLY PROJECTING FROM A DRIVE SHAFT

[75] Inventor: Fritz Schädlich, Leinfelden-Echterdingen, Fed. Rep. of Germany

[73] Assignee: Robert Bosch GmbH, Stuttgart, Fed. Rep. of Germany

[21] Appl. No.: 188,597

[22] Filed: Sep. 19, 1980

[30] Foreign Application Priority Data

Oct. 12, 1979 [DE] Fed. Rep. of Germany ........ 2941358

[51] Int. Cl.³ .......................... B23D 61/02; B27B 5/32
[52] U.S. Cl. ....................................... 83/543; 83/666; 83/698
[58] Field of Search ................. 83/666, 698, 699, 543; 30/388; 51/168

[56] References Cited

U.S. PATENT DOCUMENTS

| | | | |
|---|---|---|---|
| 51,478 | 12/1865 | Rand | 83/666 |
| 335,336 | 2/1886 | Byrkit | 83/666 |
| 1,286,799 | 12/1918 | Schuler et al. | 83/666 |
| 2,854,042 | 9/1958 | Robinson | 83/666 |
| 4,205,572 | 6/1980 | Weiner | 83/666 |

*Primary Examiner*—Frank T. Yost
*Attorney, Agent, or Firm*—Michael J. Striker

[57] ABSTRACT

An arrangement for frictionally coupling a saw blade to a trunnion projecting from one end of a drive shaft and permitting rotation of the saw blade relative to the trunnion upon excessive strain on the saw blade, in which the saw blade can be mounted only in a correct way in accordance with the direction of rotation of the drive shaft on the trunnion. The saw blade is frictionally held between two annular clamping elements on the trunnion. One of the annular clamping elements abuts against a shoulder formed at the junction of the drive shaft and trunnion and the other abuts directly or under the imposition of a pressure ring against the head of a screw screwed into an axial bore extending from the end face of the trunnion into the latter. The saw blade has an axial projection and the annular clamping element on the side of this projection is constructed in such a manner that the saw blade, without being hindered by the projection, may abut against this clamping element and turn relative thereto. The axial projection holds at the wrong mounting of the saw blade on the trunnion the various elements so far apart that one of the clamping elements cannot be pushed onto the trunnion or the screw not be screwed onto the threaded bore.

13 Claims, 6 Drawing Figures

ARRANGEMENT FOR FASTENING A CIRCULAR SAW BLADE ON A TRUNNION AXIALLY PROJECTING FROM A DRIVE SHAFT

BACKGROUND OF THE INVENTION

The present invention relates to an arrangement for fastening a circular saw blade to a trunnion of reduced diameter projecting from one end of a drive shaft and comprising two annular clamping elements arranged on the trunnion at opposite sides of the saw blade and frictionally holding the latter between the two clamping elements, one of which abuts on a shoulder formed at the junction of the drive shaft and the trunnion whereas the other clamping element abuts directly or under interposition of a pressure ring against the head of a screw screwed into a threaded bore extending from the end face of the trunnion into the latter. In a known arrangement of this kind in which the friction between the clamping element and the saw blade serves as a slip clutch preventing overloading of the saw blade, there is usually provided on the saw blade a symbol in the form of an arrow indicating the direction of rotation of the drive shaft which should prevent wrong mounting of the saw blade on the latter respectively on the trunnion projecting therefrom. Despite this indication on the saw blade, it happens quite often that the saw blade is mounted on the trunnion in a wrong manner because no constructive means are provided which would prevent actually a wrong mounting of the saw blade on the trunnion. At an arrangement in which the saw blade is fixedly coupled to the trunnion, it is already known to construct the coupling means assymmetrically so that the saw blade may be mounted on the trunnion only in the correct position (Deutsches Gebrauchsmuster No. 18 78 647). This solution is, however, not possible in a fastening arrangement with a slip clutch between the saw blade and the trunnion since in such an arrangement a permanent fixed connection between the saw blade and trunnion is not usable.

SUMMARY OF THE INVENTION

It is an object of the present invention to provide an arrangement for fastening a circular saw blade to a trunnion of reduced diameter projecting axially from a drive shaft rotating in a given direction in which a wrong mounting of the saw blade is prevented with simple constructive means which will not influence the frictional connection and the proper function of the slip clutch between the saw blade and the trunnion formed by the frictional connection.

With these and other objects in view, the arrangement according to the present invention mainly comprises a drive shaft rotating in a given direction and having a trunnion of reduced diameter axially projecting from one end of the drive shaft to form at the junction of the drive shaft and trunnion an annular shoulder, a pair of annular clamping elements on the trunnion, circular saw blade means mounted freely rotatable on the trunnion between the annular clamping elements, a pressure ring engaging with one end face thereof an end face of one of the annular clamping elements directed away from saw blade means, a screw threadingly connected into a threaded bore in the trunnion and having a head engaging the opposite end face of the pressure ring to thereby press one annular clamping element against the saw blade means and the other of the annular clamping elements against the shoulder, the annular clamping elements together with the pressure ring and screw forming slip clutch means connecting the saw blade means to the trunnion of the drive shaft for rotation, the slip clutch means and the saw blade means being constructed to cooperate with each other to permit mounting of the saw blade means on the trunnion only in a correct way in accordance with the direction of rotation of the drive shaft.

The saw blade means preferably comprise an annular saw blade and at least one projection extending for a predetermined length from one side thereof and one of the annular clamping elements being provided with an annular groove of an axial length according to the aforementioned predetermined length which has a dimension that when the saw blade is mounted in a wrong way on the trunnion the annular clamping elements will be axially spaced from each other so that the clamping element which is spaced from the shoulder cannot be pushed onto the trunnion.

The aforementioned annular groove is provided on the annular clamping element which engages the shoulder. The aforementioned projection may be an annular projection of an inner diameter substantially equal to the outer diameter of the trunnion.

In a preferred arrangement, the axial projection is formed by at least a tongue projecting radially spaced from the axis of the trunnion for a predetermined distance from one side of the saw blade over the outer periphery of one of the annular clamping elements and in which the other of the annular clamping elements has an outer radius which is greater than the given radial distance of the tongue and the predetermined length of the tongue is made such that when the saw blade is mounted the wrong way on the trunnion, the annular clamping elements will be spaced from each other so that the clamping element which is spaced from the shoulder cannot be pushed any longer on the trunnion.

In all these cases, it is possible to mount a normal saw blade on the trunnion so that the arrangement may be universely used.

The saw blade means may also comprise an annular saw blade, a ring freely turnable on the trunnion and coupling means for coupling the saw blade to the ring for rotation with the latter, wherein the coupling means are constructed to prevent a wrong mounting of the saw blade on the ring. The ring is provided with a projection extending for a predetermined length from one side thereof and one of the clamping elements is provided with an annular groove of an axial length according to the predetermined length of the projection and said predetermined length is such that when the saw blade means is mounted the wrong way on the trunnion, the annular clamping elements are spaced from each other so that the clamping element which is spaced from the shoulder cannot be pushed onto the trunnion.

The coupling means in this case may be constituted by two pins projecting from an end face of the ring and being engaged in bores of the saw blade, in which the two pins are respectively arranged in two radial planes including the axis of the trunnion and being respectively spaced different distances from the axis. In this construction, the saw blade need not be provided with an axial projection, but only with bores therethrough which simplifies the construction of the saw blade.

On the other hand, the coupling means may comprise an additional annular projection, extending from the other side of the ring, on which the saw blade is mounted and this additional projection has an outer peripheral surface and the saw blade has a corresponding inner peripheral surface deviating from a circle and being assymmetric with respect to any radial plane including the axis of the trunnion.

Another possibility to prevent wrong mounting of the saw blade together with the two annular clamping elements on the trunnion consists in forming the seat on the trunnion for the annular clamping element abutting against the shoulder in such a manner that the other annular clamping element cannot be pushed onto this seat.

The clamping element which is arranged between the shoulder and the saw blade may have still further functions, for instance, it may serve at its end face directed away from the saw blade as an abutment for a ball bearing. If this clamping element is held in some way on the trunnion that it cannot easily be removed therefrom, it is possible to omit the additional safety measure against wrong mounting of the saw blade together with the two clamping elements and to take only care that saw blade per se cannot be mounted the wrong way on the trunnion.

The novel teachings which are considered as characteristic for the invention are set forth in particular in the appended claims. The invention itself, however, both as to its construction and its method of operation, together with additional objects and advantages therefor, will be best understood from the following description of specific embodiments when read in connection with the accompanying drawings.

DESCRIPTION OF PREFERRED EMBODIMENTS

Figure 1:
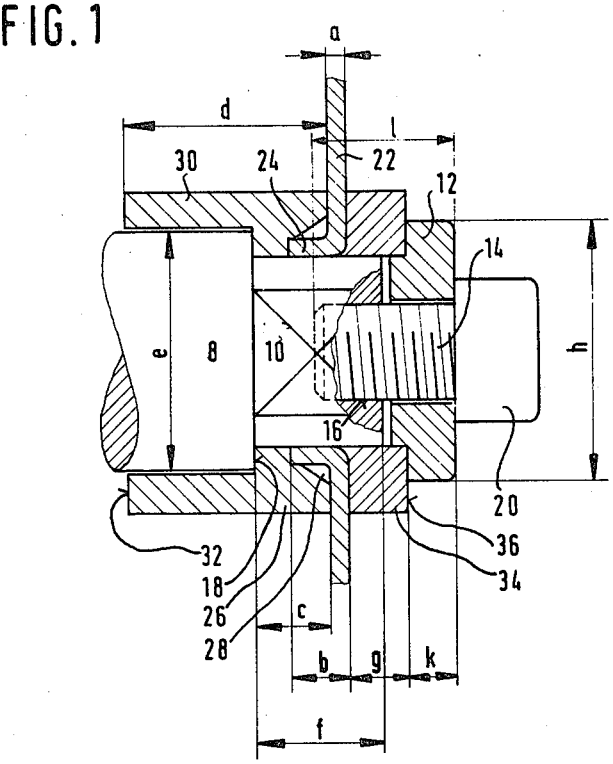
FIG. 1 is an axial cross section through a first embodiment of the arrangement according to the present invention.

The drive shaft 8 is provided in all four modifications shown with a trunnion 10 projecting axially therefrom and having a diameter smaller than that of the drive shaft 8. A saw blade is clamped on the trunnion 10 by means of a pressure ring 12 and a screw 14 screwed into a threaded bore 16 which extends from the end face of the trunnion 10 coaxially with the trunnion into the latter. An annular shoulder 18 is formed at the junction of the trunnion 10 and the drive shaft, against which the screw 14 presses the saw blade and two at opposite sides of the saw blade arranged clamping elements, which will be further described later on, whereby the pressure ring 12 abuts against the head 20 of the screw 14.

In the embodiment shown in FIG. 1, the saw blade 22 of a wall thickness "a" is provided at the inner circumference thereof with an annular projection 24 extending in axial direction at the inner circumference of the saw blade 22 from one side of the latter and the end face of the projection 24 is spaced by a distance "b" from the opposite side of the saw blade. The saw blade 22 and the annular projection 24 thereof constitute saw blade means. An annular clamping element 26 is arranged between the saw blade 22 and the shoulder 18 and having an increased bore section 28 for receiving the annular projection 24 of the saw blade and the portion of the annular clamping element 26 extending in the region of the trunnion 10 has an axial length designated with "c". The annular clamping element 26 has at one side an annular projection 30 which surrounds the drive shaft with small play, the free end face 32 thereof is spaced by a dimension "d" from the other end face of the clamping element 26 which abuts against the saw blade 22. The inner diameter of the annular projection 30 has a dimension "e" which is slightly greater than the outer diameter of the drive shaft 8. The length of the trunnion 10 is designated with "f" and the trunnion 10 is provided over its whole length thereof with a flat face intersecting the otherwise circular profile of the trunnion. The bore in the annular clamping element 26 corresponds to the profile of the trunnion so that the annular clamping element is connected to the trunnion for rotation therewith.

A second annular clamping element 34, the length of which is designated with "g", abuts against the other side face of the saw blade 22 and the second clamping element 34 is likewise connected to the trunnion 10 for rotation therewith and projects a small distance beyond the end face of the latter. A pressure ring 12 abuts against the end face 36 of the clamping element 34 which is directed away from the saw blade. The outer diameter "h" of the pressure ring 12 is slightly larger than the inner diameter "e" of the collar 30 of the clamping element 26 which extends over the drive shaft 8 and the pressure ring 12 projects for a distance "k" beyond the clamping element 34. The head 20 of a screw 14 screwed into a corresponding bore in the trunnion 10 abuts against the pressure ring 12 and presses the latter against the clamping element 34. The length of the threaded portion of the screw 14 is designated with the letter "l". The saw blade 22 is held by friction between the two annular clamping elements 26 and 34 which are non-rotatably mounted on the trunnion 10 and the saw blade 22 may turn relative to the trunnion when the moment applied to the saw blade surpasses the friction force controlled by the screw 14.

If the saw blade 22 is correctly mounted on the trunnion 10, its annular projection 24 is directed against the shoulder 18 formed at the junction of the drive shaft 8 and the trunnion 10, and received in the enlarged bore portion 28 of the annular clamping element 26. If the annular clamping element 26 is correctly mounted, but the saw blade placed in the reversed position on the trunnion 10, there will result between the shoulder 18 and the end face of the annular projection 24 a distance b+c which is equal or slightly greater than the length "f" of the trunnion 10. In this case, the annular clamping element 34 cannot be placed on the trunnion 10 so that the wrong position of the saw blade 22 will become evident. If, in this case, the screw 14 is tightened while the annular clamping element 34 is omitted, the wrongly mounted saw blade 22 cannot be clamped because the pressure ring 12 will abut against the end face of the trunnion while the offset clamping face of the pressure ring still has a certain distance from the end face of the annular projection 24.

If the annular clamping element 26 and the saw blade 22 are mounted the wrong way, the end face 32 of the annular clamping element 26 will project for the distance a+b−f beyond the end face of the trunnion 10. In this case, the annular clamping element 24 can likewise not be put on the trunnion 10. If, despite this fact, it should be tried to clamp the saw blade 22 without the annular clamping element 34, the pressure ring 12 would abut due to its larger outer diameter "h" against the end face 32 of the annular clamping element 26 so that between the head 20 of the screw 14 and the end face of the trunnion 10 a distance of the length a+d−f+k would result, which is equal to or greater than the length of the threaded portion of the screw 14 so that the latter could not be screwed into the threaded bore in the trunnion.

If in another case, the annular clamping element 26 is erroneously omitted and the saw blade 22 placed in the wrong position onto the trunnion 10, then the clamping face 36 of the annular clamping element 34 is rearwardly displaced from the end face of the trunnion 10 by the distance f−b−g so that during tightening of the screw 14 the pressure ring 12 will abut against the end face of the trunnion 10 and the saw blade 22 cannot be clamped, which again will be immediately noticed.

Figure 2:
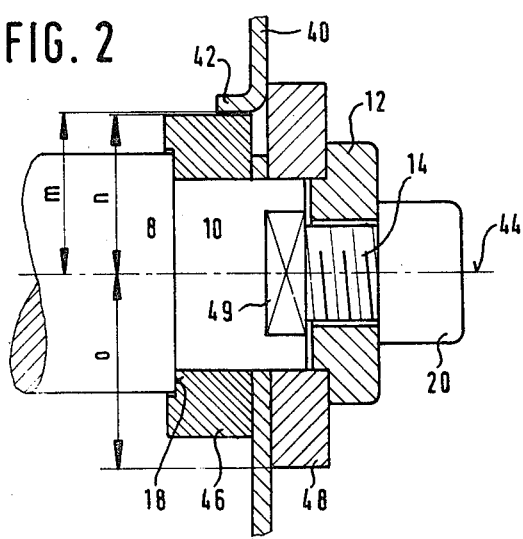
FIG. 2 is an axial cross section through a second embodiment.

In the embodiment shown in FIG. 2, the saw blade 40 has one or a plurality of axially projecting tongues 42 having a distance "m" from the axis of rotation 44 of the drive shaft 8. A first annular clamping element 46 is arranged between the saw blade 40 and the shoulder 18 on the trunnion and this first annular clamping element 46 has an outer diameter "n" which is slightly smaller than the distance "m" of the tongue 42 from the axis 44. A second annular clamping element 48 is arranged on the trunnion 10 abutting against the other side of the saw blade 40 and the second annular clamping element 48 has an outer radius "o" which is larger than the distance "m". The peripheral surface of the trunnion 10 is provided in the region of the second annular clamping element 48 with a flat face 49 and the bore in the second clamping element 48 conforms to this from the cylindrical form deviating cross section of the trunnion so that the second annular clamping element 48 is connected to the trunnion 10 for rotation therewith. The first annular clamping element 46 has a circular bore and can be pushed onto the trunnion 10 until it abuts against the shoulder 18.

If the first annular clamping element 46 is correctly but the saw blade 40 incorrectly mounted on the trunnion 10, then the tongue 42 on the saw blade 40 prevents pushing of the second annular clamping element 48 onto the trunnion 10. A wrong mounting of the saw blade 40 together with the annular clamping elements 46 and 48 is not possible since the second annular clamping element 48 can be pushed only so far onto the trunnion 10, as the flat face 49 thereon extends in axial direction. The third possible mistake, that is, to omit the first annular clamping element 46 and to mount the saw blade 40 in the wrong way, would also be immediately recognized, since in this case the saw blade can again not be clamped.

In the above-described embodiment illustrated in FIGS. 1 and 2, the axial projection of the saw blade, that is, the annular projection 24 or the tongue 42, are integrally formed with the saw blade. In the following embodiment, illustrated in FIGS. 3 and 4, these axial projections are constituted by an additional ring connected to the saw blade for rotation therewith, so that the saw blade may be formed only with holes which can be easily produced by punching.

Figure 3:
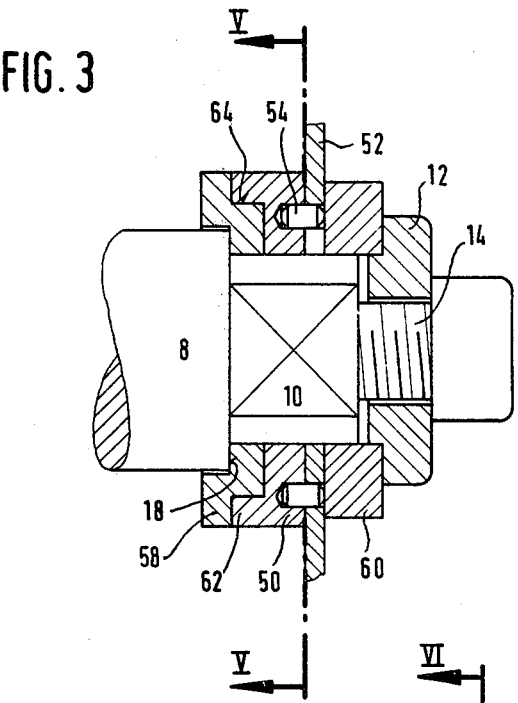
FIG. 3 is an axial cross section through a third embodiment.
Figure 5:
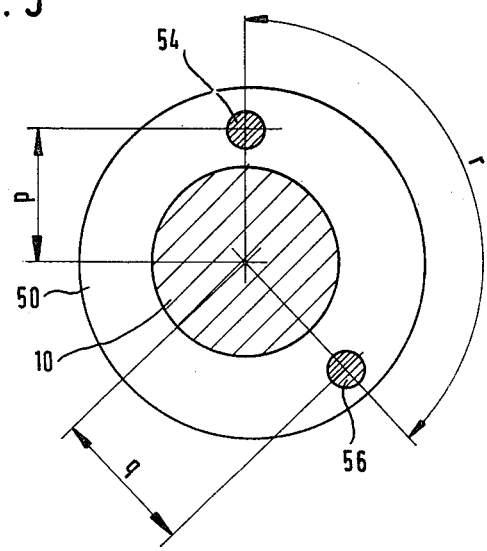
FIG. 5 is a section according to the line V—V in FIG. 3.

In the embodiment shown in FIG. 3, there is provided an additional ring 50 which is connected with a saw blade 52 for rotation therewith by means of two pins 54 and 56. As shown in FIG. 5, the two pins 54 and 56 are located spaced at different distances "p" and "q" from the axis of the drive shaft 8 and are in addition circumferentially displaced from each other through an angle "r", which may have any value differing from 180°. Due to the different distances "p" and "q" of the two pins 54 and 56 from the axis of the drive shaft, and due to the circumferential displacement of the two pins through an angle deviating from 180°, the saw blade 52 can only be placed in the correct manner onto the ring 50.

The ring 50 and the saw blade 52 forming together saw blade means, are frictionally clamped between a pair of annular clamping elements 58 and 60 which in turn are mounted on the trunnion 10 provided at its peripheral surface with a flat face for rotation therewith. The ring 50 has an axial collar 62 which extends over a correspondingly reduced diameter portion 64 of the annular clamping element 58. The axial collar 62 has the same function as the annular projection 24 of the saw blade shown in FIG. 1. The axial length of the axial collar 62 is dimensioned in such a manner that the annular clamping element 60 cannot be pushed onto the trunnion 10 when the saw blade 52 together with its ring 50 are mounted the wrong way on the trunnion 10. A guarantee against wrong mounting of the saw blade 50 together with the rings 54, 58 and 60 is not provided in the embodiment shown in FIG. 3. However, such a guarantee could be obtained if either the annular clamping element 58 would be provided with a correspondingly long axial collar as shown at 30 in FIG. 1, or that in accordance with FIG. 2, care would be taken that only the annular clamping element can be pushed up to the shoulder 18 onto the trunnion 10, whereas the annular clamping element 60 can be pushed only for a certain distance onto the trunnion 10.

Figure 4:
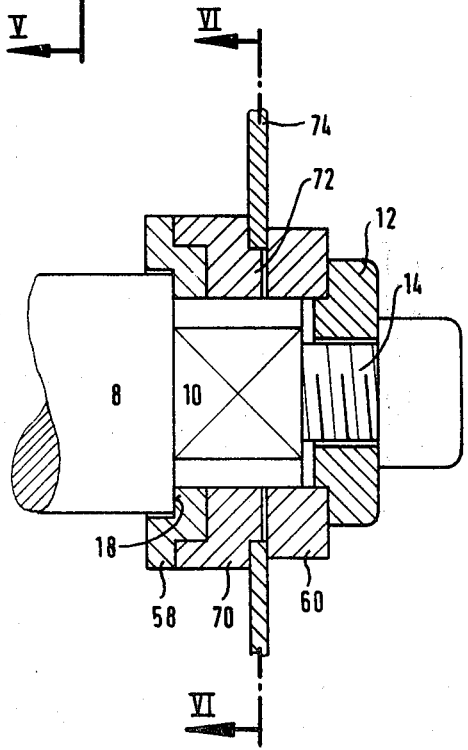
FIG. 4 is an axial cross section through a fourth embodiment.
Figure 6:
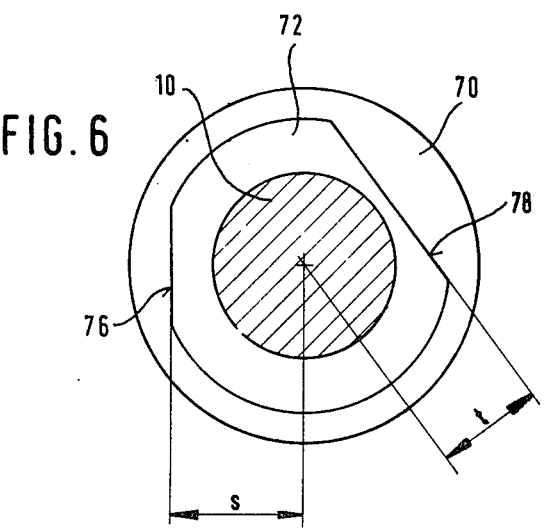
FIG. 6 is a section according to the line VI—VI of FIG. 4.

The embodiment shown in FIG. 4 differs from the above-discussed embodiment illustrated in FIG. 3 in that a carrying ring 70 provided with an integral projection 72 on which a saw blade 74 is not turnably mounted, is arranged between two annular clamping elements 58 and 60 on the trunnion 10. The integral projection 72 on the carrying ring 70 is provided on its peripheral surface with two flat faces 76 and 78, respectively having different distances "s" and "t" from the axis of the trunnion 10, and as clearly shown in FIG. 6, the flat faces 76 and 78 are not parallel to each other. The carrying ring 70 itself is, in the same way as the ring 50 in FIG. 3, freely turnable on the trunnion 10. Due to the different distances "s" and "t" of the two flat faces 76 and 78 from the axis of the trunnion 10 and due to the fact that these faces are not parallel to each other, it is assured that the two faces 76 and 78 are not mirror symmetrically arranged to any radial place including the axis of the trunnion 10. The bore in the saw blade 74 corresponds to the cross-section of the projection 72 provided with the two flat faces 76 and 78 so that a correct mounting of the saw blade 74 on the carrying ring 70 is assured whereby at the same time the saw blade 70 is connected to the carrying ring for rotation therewith.

It will be understood that each of the elements described above, or two or more together, may also find a useful application in other types of arrangements for fastening a circular saw blade on a trunnion axially projecting from a drive shaft differing from the types described above.

While the invention has been illustrated and described as embodied in an arrangement for fastening a circular saw blade on a trunnion axially projecting from a drive shaft and assuring that the saw blade can be mounted on the trunnion only in a correct way in accordance with the direction of rotation of the drive shaft, it is not intended to be limited to the details shown, since various modifications and structural changes may be made without departing in any way from the spirit of the present invention.

Without further analysis, the foregoing will so fully reveal the gist of the present invention that others can, by applying the current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement, comprising a drive shaft rotatable in a given direction and having a trunnion of reduced diameter projecting from one end thereof to form at the junction of drive shaft and trunnion an annular shoulder; a pair of annular clamping elements on said trunnion; circular saw blade means mounted freely rotatably on said trunnion between said annular clamping elements; a pressure ring engaging with an end face thereof an end face of one of said annular clamping elements directed away from said saw blade means; a screw screwed into a threaded bore in said trunnion and having a head engaging the opposite end face of said pressure ring to thereby press said one annular clamping element against the saw blade means and the other of said annular clamping elements against said shoulder, said annular clamping elements together with said pressure ring and said screw forming slip clutch means connecting said saw blade means to the trunnion of said drive shaft for rotation, said slip clutch means and said saw blade means being constructed to cooperate with each other to permit mounting of said saw blade means on said trunnion only in a correct way in accordance with the direction of rotation of said drive shaft.

2. An arrangement as defined in claim 1, wherein said saw blade means comprises an annular saw blade and at least one projection extending for a predetermined length from one side thereof, one of said annular clamping elements being provided with an annular groove of an axial length according to said predetermined length, and arranged for receiving said projection, said predetermined length being such that when said saw blade means is mounted in a wrong way on said trunnion, said annular clamping elements will be axially spaced from each other so that the clamping element which is spaced from said shoulder cannot be pushed onto said trunnion.

3. An arrangement as defined in claim 2, wherein said annular groove is provided in the annular clamping element which abuts against the shoulder.

4. An arrangement as defined in claim 2, wherein said projection is an annular projection of an inner diameter substantially equal to the outer diameter of said trunnion.

5. An arrangement as defined in claim 1, wherein said saw blade means comprises an annular saw blade and a tongue projecting radially spaced a given distance from the axis of said trunnion for a predetermined length from one side of said saw blade over the outer periphery of one of the annular clamping elements, the other of said annular clamping elements having an outer radius which is greater than said given radial distance of said tongue, said predetermined length of said tongue being such that when said saw blade means is mounted the wrong way on said trunnion, said annular clamping elements will be axially spaced from each other so that the clamping element which is spaced from said shoulder cannot be pushed on said trunnion.

6. An arrangement as defined in claim 5, wherein said one clamping element is a clamping element which abuts against said shoulder.

7. An arrangement as defined in claim 1, wherein said saw blade means comprises an annular saw blade, a ring freely turnable mounted on said trunnion and coupling means for coupling said saw blade to said ring for rotation with the latter, said coupling means being constructed to prevent wrong mounting of said saw blade on said ring, said ring being provided with a projection extending for a predetermined length from one side thereof, one of said clamping elements being provided with an annular groove of an axial length according to said predetermined length and arranged for receiving said projection, said predetermined length being such that when said saw blade means is mounted the wrong way on said trunnion, said annular clamping elements are spaced from each other so that the clamping element which is spaced from said shoulder cannot be pushed onto said trunnion.

8. An arrangement as defined in claim 7, wherein said coupling means are constituted by two pins projecting from an end face of said ring and being engaged in bores of said saw blade, wherein said two pins are arranged in two radial planes including the axis of said trunnion and being respectively spaced different distances from said axis.

9. An arrangement as defined in claim 7, wherein said coupling means comprises an additional annular projection extending from the other side of said ring on which said saw blade is mounted, and wherein said annular projection has an outer peripheral surface and said saw blade means has a corresponding inner peripheral surface deviating from a circle and being assymmetrical with respect to any radial plane including the axis of said trunnion.

10. An arrangement as defined in claim 1, wherein said two annular clamping elements have different forms which are constructed in such a manner as to permit mounting of said saw blade means and the two annular clamping elements on said trunnion only in one way in accordance with the direction of rotation of said drive shaft.

11. An arrangement as defined in claim 10, wherein one of said annular clamping elements has an annular projection extending from said shoulder over said drive shaft, said annular projection having an inner diameter which is smaller than the outer diameter of said pressure ring and said annular projection having an axial length dimensioned in such a manner so that at the wrong mounting of said saw blade means and the two annular clamping elements on said trunnion said screw cannot be screwed into said threaded bore.

12. An arrangement as defined in claim 10, wherein the seat formed on said trunnion for the annular clamping element abutting against said shoulder is formed in a such a manner that the other annular clamping element cannot be pushed onto said seat.

13. An arrangement as defined in claim 1, wherein the outer peripheral surface of said trunnion and the inner peripheral surface of said pair of annular clamping elements are constructed for connecting said clamping elements to the trunnion for rotation therewith.

* * * * *